Figures 1, 2:
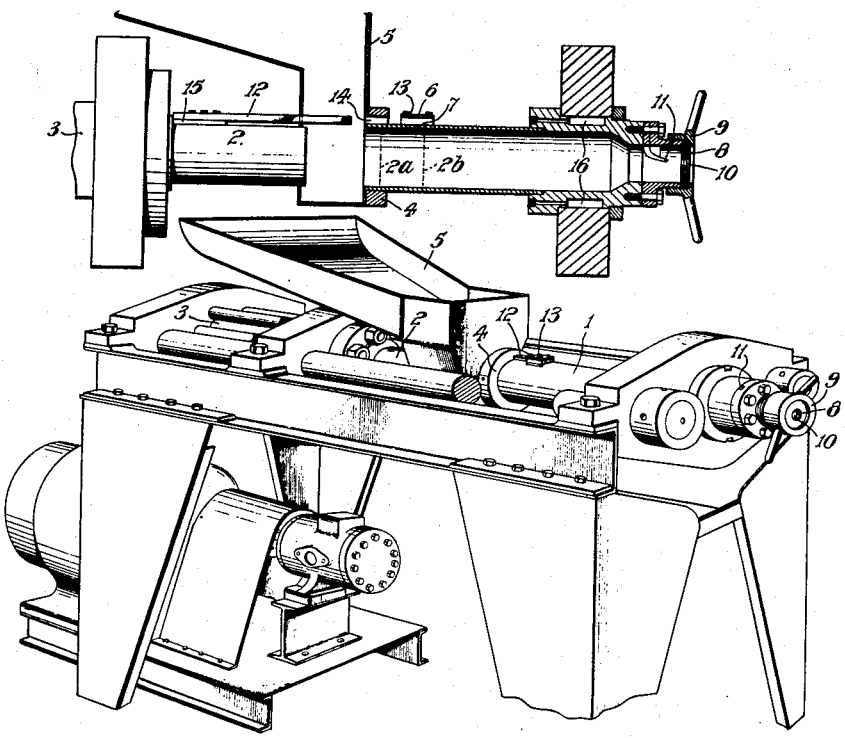

May 25, 1954  D. J. KEOGH  2,679,069
MANUFACTURE OF WAX CANDLES AND LIKE ARTICLES
Filed Dec. 27, 1951

DANIEL JAMES KEOGH
INVENTOR.

BY James Todorovic

ATTORNEY

Patented May 25, 1954

2,679,069

UNITED STATES PATENT OFFICE 2,679,069

MANUFACTURE OF WAX CANDLES AND LIKE ARTICLES

Daniel James Keogh, Saltdean, England, assignor to Price's Patent Candle Company Limited, London, England, a British company Application December 27, 1951, Serial No. 263,652

Claims priority, application Great Britain January 1, 1951

3 Claims. (Cl. 18—13)

Candles and like articles such as, for example, tapers and the product known in the art as wax wire, have hitherto been manufactured by batch processes utilising molten wax. Thus the long-standing conventional method of making candles is by casting the wax in moulds containing a length of wick, while tapers and wax wire are made by repeatedly passing a long length of wick through a bath of molten wax until the desired thickness of wax has been built up. Proposals have been advanced for making these products by a continuous extrusion process in which wax, cooled in the extrusion apparatus from the liquid to a semi-solid or plastic state, is extruded through an orifice to the centre of which a wick is continuously fed, the wax-covered wick being thereupon subjected to water-cooling in order to solidify the wax. Owing, however, to the particular thermal properties of wax, difficulties are encountered in carrying out this process and it has not hitherto been adopted commercially.

The present invention is based on the discovery that solid wax in particulate form can be extruded under pressure through an orifice to give a solid coherent rod having a strength comparable with that of a cast rod of the same diameter. The invention accordingly comprises a method of making a rod of wax, which comprises extruding particulate solid wax under pressure through an orifice.

Further it has been discovered that if the particulate solid wax is extruded round a wick fed to the centre of the orifice the wick adheres firmly to the wax and will burn as efficiently as a conventional moulded candle. The invention accordingly further comprises a manufacture of wax candles and like articles which comprises extruding particulate solid wax under pressure through an orifice, to the centre of which a wick is guided so as to be free to be drawn forward by the extruded wax.

The term "particulate solid wax" as used herein includes solid wax in the form of flakes and/or of a powder composed of particles of any configuration, for example spheroidal, cubic, cylindrical or devoid of regularity. The component flakes or particles may be homogeneous or unhomogeneous as to size and shape. The wax may be reduced to the particulate form by any convenient process, but I have found that an advantageous process which gives a powder suited to the invention consists in spraying fine droplets of liquid wax into the air over a trajectory sufficiently long to allow the droplets to solidify before they are collected. Droplets of suitable size can be obtained, for example, by spraying the liquid wax through a conventional atomiser of the type used for the atomisation of liquid fuel, such as a pressure jet atomiser in which atomisation is brought about by rotational velocity imparted to the liquid in a swirl chamber. As explained below, it is, however, in many cases preferred to use flaked wax, and this may be obtained by causing liquid wax to flow over chilled rollers from which the solidified layer of wax is removed, thereupon breaking up into flakes. Instead of spraying or flaking liquid wax, solid wax may be reduced to particulate form by subjecting it, for example, to milling, cutting or other process of mechanical disintegration.

The particulate solid wax may be fed to the extrusion cylinder at ordinary room temperatures. The extruded rod of wax absorbs some of the heat of extrusion but is still sufficiently solid to maintain its extruded shape without appreciable distortion. The rod may conveniently be cut into lengths as it emerges from the die, but where such lengths have to be subjected to a further cutting or shaving operation, as for example, in the manufacture of candles, to form the tip of the candle, it is preferred to allow the lengths of rod to cool at least to room temperature before performing such further operation.

When the extruded rod has stood for a short time after extrusion, the surface may be found to be slightly roughened. Any such surface roughness is only significant where surface finish is of prime importance, for example in the case of good quality candles. In such cases the outer surface of the rod or lengths of rod may be shaved or stripped off or polished in any convenient manner. It is thought that this surface roughening which sometimes occurs may be due to the expansion of small quantities of air occluded in the wax during the extrusion process. In order to minimise such occlusion it is advantageous to remove or expel air from the extrusion cylinder during the initial part of the stroke of the extrusion piston. This may be effected by providing the cylinder with a port to atmosphere which is open during the initial part of the piston stroke and is then closed, for example by the piston or a member attached thereto, for the remainder of the stroke. Escape of the air is facilitated by using wax in the form of flakes, and I have found that by using flaked wax in an extrusion cylinder provided with a port for the escape of air as just described, it is possible to produce a rod which exhibits no or no appreciable surface roughening.

The invention further comprises apparatus for carrying out the manufacture of wax candles and like articles according to the invention, which includes a piston operating in an extrusion cylinder having an aperture which communicates with the mouth of a hopper for particulate wax and is uncovered or opened by the piston on its idle stroke so as to allow the wax in the hopper to fall into the space left vacant by the piston, and means for guiding a continuous wick to the centre of the extrusion orifice so as to leave the wick free to be drawn forward by the extruded wax.

A preferred form of apparatus according to the invention is illustrated by way of example by the accompanying drawings, in which Figure 1 is a perspective view of the extrusion apparatus, and Figure 2 is a diagrammatic sectional elevation thereof.

The extrusion apparatus comprises an extrusion cylinder 1 in which a piston 2 is reciprocated by means of hydraulic fluid supplied in known manner to a hydraulic cylinder 3. The rear end of the cylinder 1 opens into the outlet end of a hopper 5 having a flange 4 fitting round the outside of the cylinder. The cylinder 1 terminates at its front end in a die plate 8 secured by a cap 9. In the example shown, the die plate is provided with a single extrusion orifice 10, although a number of orifices, for example four, could be provided if desired. A wick guide tube 11 terminates at a short distance behind the orifice 10. The side wall of the cylinder 1 is provided at its upper part with an air vent 7 which opens into a valve chest 13 whose top closure is provided with a port 6 to atmosphere. A valve rod 12 bolted or otherwise fixed to a projection 15 on the piston 2 extends beyond the front face of the piston and is adapted to fit in the valve chest 13 and close the air vent 7 when the piston has completed part of its forward stroke. The flange 4 is provided with a guide hole 14 to accommodate the valve rod 12.

In operation, the hopper 5 is charged with particulate solid wax, which may be in the form of flakes or powder, preferably the former. The wax may be of the kind normally used in candle-making, and may contain known additives such as, for example, polythene. If wax in the form of powder is to be used, this powder may be prepared by the following method: The wax is melted and then supplied to a pressure jet atomiser at a pressure sufficient to secure atomisation of the wax. The atomiser is orientated approximately horizontally and the wax falls on a slowly moving belt conveyor situated sufficiently far below the atomiser to ensure solidification of the droplets in the air before they are collected in a thin layer on the belt. The particulate wax may be conveyed directly to the extrusion apparatus, but it is generally more convenient first to store it in containers, to allow for differences in the timing and phasing of the atomisation and extrusion processes. Storage of the powdered wax will also facilitate cooling of the wax to room temperature or below, if this is necessary.

When the piston 2 has completed its idling or backward stroke, as shown in full lines in Figure 2, a charge of particulate wax falls into the space at the bottom of the hopper left vacant by the piston. On the next forward or working stroke of the piston 2, the charge is first pushed into the rear end of the cylinder 1 and is then subjected to a process of consolidation, during which most of the air present in the interstices between the particles is expelled through the vent 7. A certain amount of wax also issues through this vent and may be allowed to fall round the outside of the cylinder into a container. When the piston has completed part of its forward stroke, as indicated in broken lines at 2a, the valve rod 12 carried thereby enters the valve chest 13 and closes the vent 7. During the remainder of the stroke wax is extruded through the orifice 10. The piston in its foremost position is shown in broken lines at 2b.

The extrusion of the powdered wax has the effect of binding the particles together into a coherent solid mass, and this effect is assisted by the heat generated by the friction of the wax on the walls of the extrusion cylinder 1 and die 8. While some heating of the wax, such as is caused by friction, is advantageous, this heating must not be excessive and it may even be desirable in certain conditions to cool the die and/or cylinder. In other cases some external heating of the cylinder may be desirable. A jacket 16 is provided for the circulation of any heating or cooling fluid which may be desired.

A wick fed by a bobbin (not shown) is guided by guide tube 11 to a point on the axis of and just behind the extrusion orifice 10, so that the wick is carried forward by the extruded wax and forms a central core thereto.

The rod issuing from the orifice 10 is cut into lengths, tipped and, if necessary, stripped to remove surface roughness, by any convenient means.

I claim:

1. An apparatus for the manufacture of wax candles and like articles which comprises a piston operating in an extrusion cylinder having an aperture which communicates with the mouth of a hopper for particulate wax and is uncovered by the piston on its idle stroke so as to allow the wax in the hopper to fall into the space left vacant by the piston, means for guiding a continuous wick to the center of the extrusion orifice so as to leave the wick free to be drawn forward by the extruded wax, the extrusion cylinder being provided with a port to atmosphere positioned to be opened during the initial part of the piston stroke and a closing means for said port for the remainder of the stroke.

2. An apparatus according to claim 1 wherein the port closing means comprises a valve rod projecting beyond the front face of the piston.

3. An apparatus according to claim 2 wherein a valve chest surmounts said port and the valve rod projecting beyond the front face of the piston is positioned to engage the valve chest when closing said port for the remainder of the stroke.

References Cited in the file of this patent

UNITED STATES PATENTS

| Number | Name | Date |
| --- | --- | --- |
| 5,139 | Shelabarger | June 5, 1847 |
| 1,294,008 | Will | Feb. 11, 1919 |
| 1,356,891 | Steinle | Oct. 26, 1920 |
| 2,245,640 | Beattie | June 17, 1941 |